United States Patent [19]

Hasquenoph et al.

[11] 4,102,520
[45] Jul. 25, 1978

[54] DUAL-PURPOSE EJECTOR FOR AIRCRAFT LOAD JETTISONING MECHANISM

[75] Inventors: Jean H. Hasquenoph, Lagny sur Marne; Pierre Fernand Coutin, Paris, both of France

[73] Assignee: R. Alkan & Cie, Valenton, France

[21] Appl. No.: 740,141

[22] Filed: Nov. 8, 1976

[30] Foreign Application Priority Data

Mar. 22, 1976 [FR] France .................. 76 08186

[51] Int. Cl.² ........................................... B64D 1/02
[52] U.S. Cl. ............................ 244/137 R; 89/1.5 B; 89/1.5 G; 294/83 AB
[58] Field of Search ............ 244/137 R, 118 R; 89/1.5 R, 1.5 G, 1.5 B, 1.5 F, 1.5 H; 294/83 R, 83 AE, 83 AB

[56] References Cited

U.S. PATENT DOCUMENTS

| 3,503,576 | 3/1970 | Savarieau | 244/137 R |
|---|---|---|---|
| 3,854,680 | 12/1974 | Hasquenoph et al. | 244/137 R |
| 3,954,233 | 5/1976 | Hasquenoph et al. | 244/137 R |
| 3,967,528 | 7/1976 | Baker | 89/1.5 B |

FOREIGN PATENT DOCUMENTS

| 543,009 | 2/1942 | United Kingdom | 89/1.5 G |
|---|---|---|---|
| 556,097 | 9/1943 | United Kingdom | 89/1.5 B |

Primary Examiner—Trygve M. Blix
Assistant Examiner—Charles E. Frankfort
Attorney, Agent, or Firm—William Anthony Drucker

[57] ABSTRACT

An ejector serves for suspending under aircraft loads which have suspension rings or saddle members, both of known kind. The ejector includes a carrier device which has, for each load suspension point, a first pivoted hook which can coact with a saddle member, a fastener disposed adjacent to the first hook, and a detachable device removably mounted in the fastener, the detachable device having a housing for receiving the upper part of a suspension ring, a second hook pivotable about a horizontal pin and serving, in a closed position, to lock the suspension ring in the housing, and a spring urging the second hook against the first hook so that the second hook follows opening and closing movements of the first hook and is itself thereby moved into opening and closing positions.

4 Claims, 6 Drawing Figures

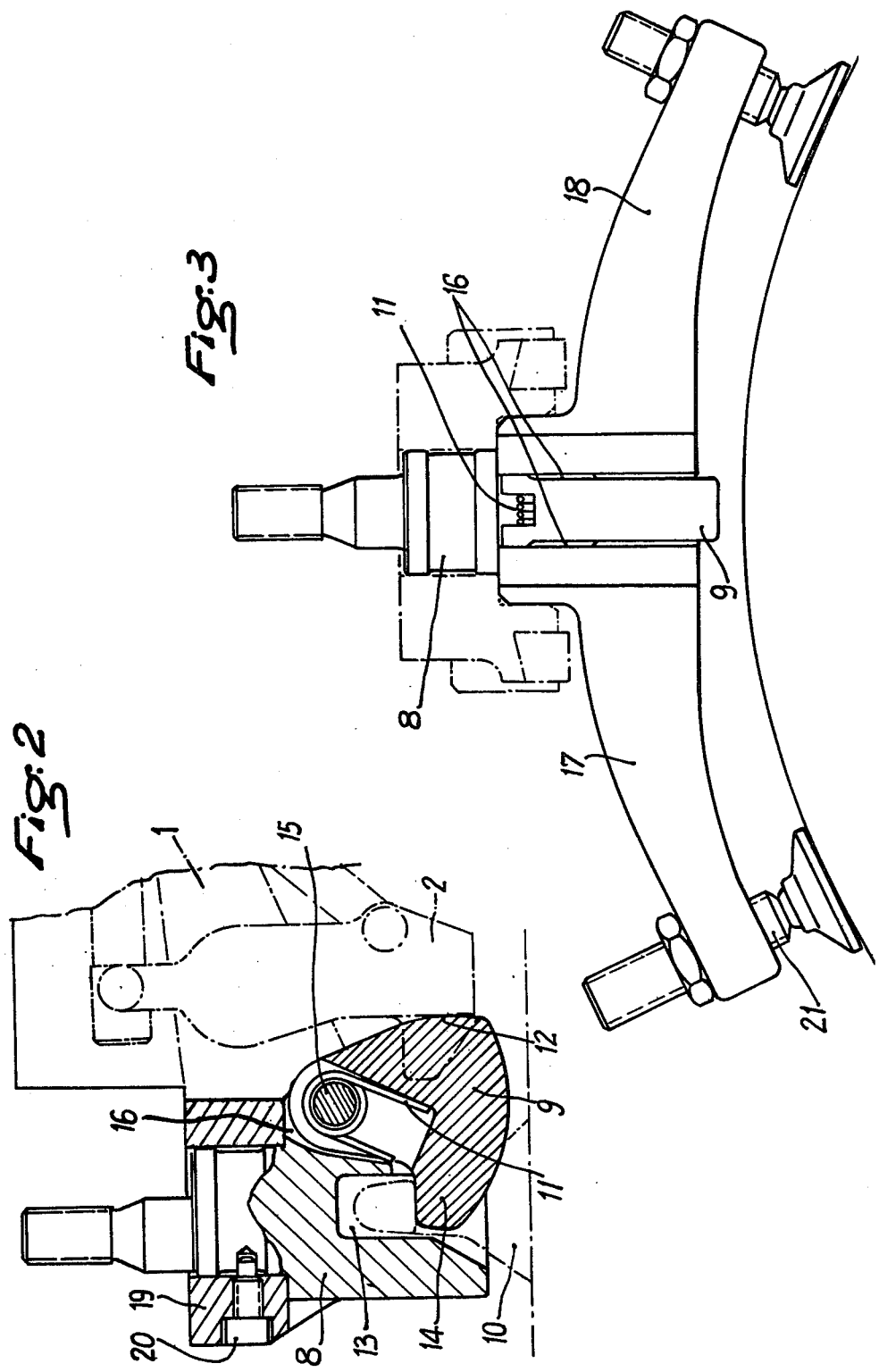

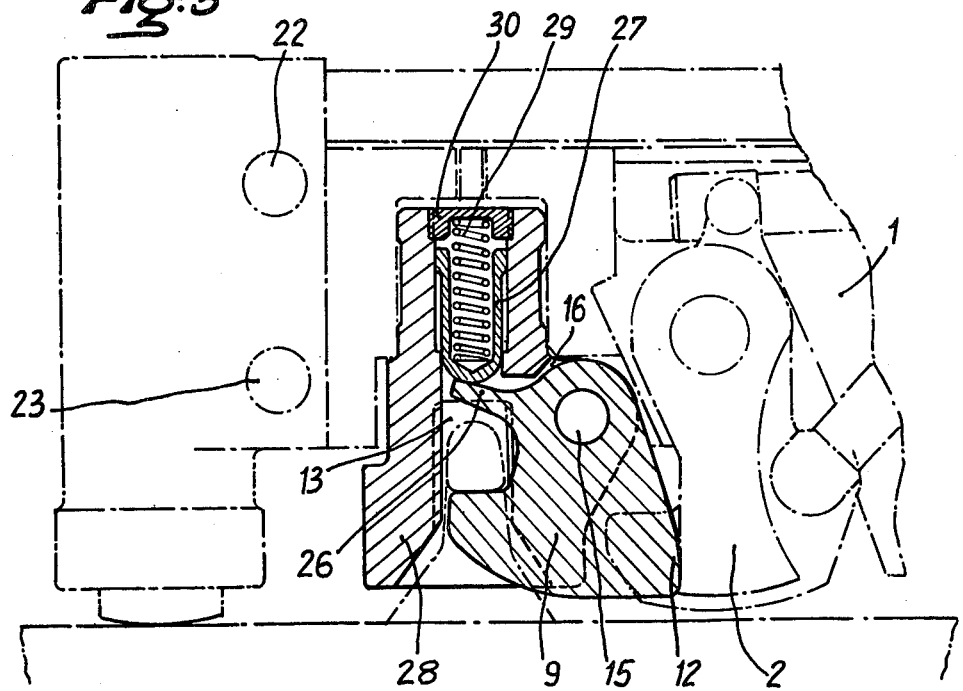
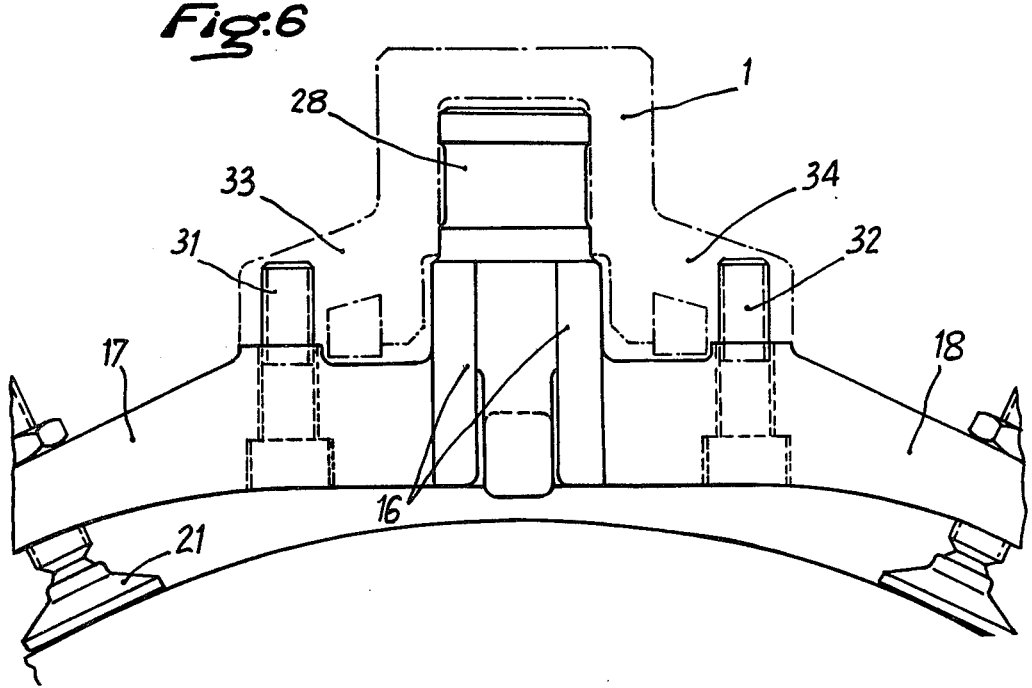

DUAL-PURPOSE EJECTOR FOR AIRCRAFT LOAD JETTISONING MECHANISM

BACKGROUND OF THE INVENTION

FIELD OF THE INVENTION

As a rule, loads carried under aircrafts comprise a pair of tapped holes disposed along a common longitudinal generatrix at a standard relative spacing. Ring means are screwed in said holes for suspending the load under carrier devices provided with hook means adapted to engage said ring means.

In certain cases and according to an increasingly popular technique, so-called "saddles" are substituted for the ring means. Each saddle comprises on the one hand a pair of opposite lateral recesses engageable by the two noses of a twin hook and on the other hand a flat top surface adapted to hold the suspended load against lateral motion by means of wedge members. Moreover, these saddles comprise a substantially cylindrical cavity of which the axis is coincident with that of the relevant tapped hole. The function of this cavity is to center a male cylindrical member rigid with the carrier device or mechanism so as to prevent longitudinal and transverse movements of translation, as well as any yawing, of the suspended load.

Aircraft operators may be led to use either loads equipped with rings, or loads equipped with saddles. The Applicants already filed on July 1st, 1976 a U.S. Pat. application under No. 701,708 reciting a device for carrying loads equipped with either of the above-mentioned systems, and characterised in that said device included a dual purpose hook that must be turned the other way so that its operative face offers either a single hook or a twin hook, according to the type of carrier system to be coped with.

DESCRIPTION OF THE INVENTION

The present invention is concerned with a device also capable of carrying loads, whether the latter comprise suspension rings or saddles, but in addition the device of this invention incorporates complementary lateral wedging elements for use only with ring-type load suspension means.

The present invention is based on the principle that at each suspension point the ejector comprises a first suspension hook suitable for one of the two types of load, more particularly a twin hook for suspending loads equipped with saddles, and that said ejector further comprises means for securing a detachable support or bracket by means of another suspension hook corresponding to loads of the other type, this detachable support or brcket being adapted to be fitted in position or removed without disassembling or modifying the internal mechanism of the ejector, the second hook becoming automatically responsive, when fitting its detachable support or bracket, to the first hook controlled directly by the ejector mechanism or to any other suitable component element of this ejector mechanism.

The above-mentioned detachable support or bracket may further comprise lateral wedging members for a load provided with rings, and be interchangeable with a centering member of a load equipped with saddles.

A typical release mechanism ejector according to this invention will now be described by way of example, not of limitation, together with a modified form of embodiment thereof, with reference to the attached drawing, in which:

BRIEF DESCRIPTION OF THE DRAWING

FIG. 2 illustrates in longitudinal section the detachable device adapted to be substituted for the centering members;

FIG. 3 is an end view of the same device;

FIG. 5 illustrates in side elevational view a detachable device similar to the one illustrated in FIGS. 2 and 3, with a different fastening system and, FIG. 6 illustrates the same device shown in end view together with its securing means.

DESCRIPTION OF THE PREFERRED EMBODIMENTS

Figure 1:
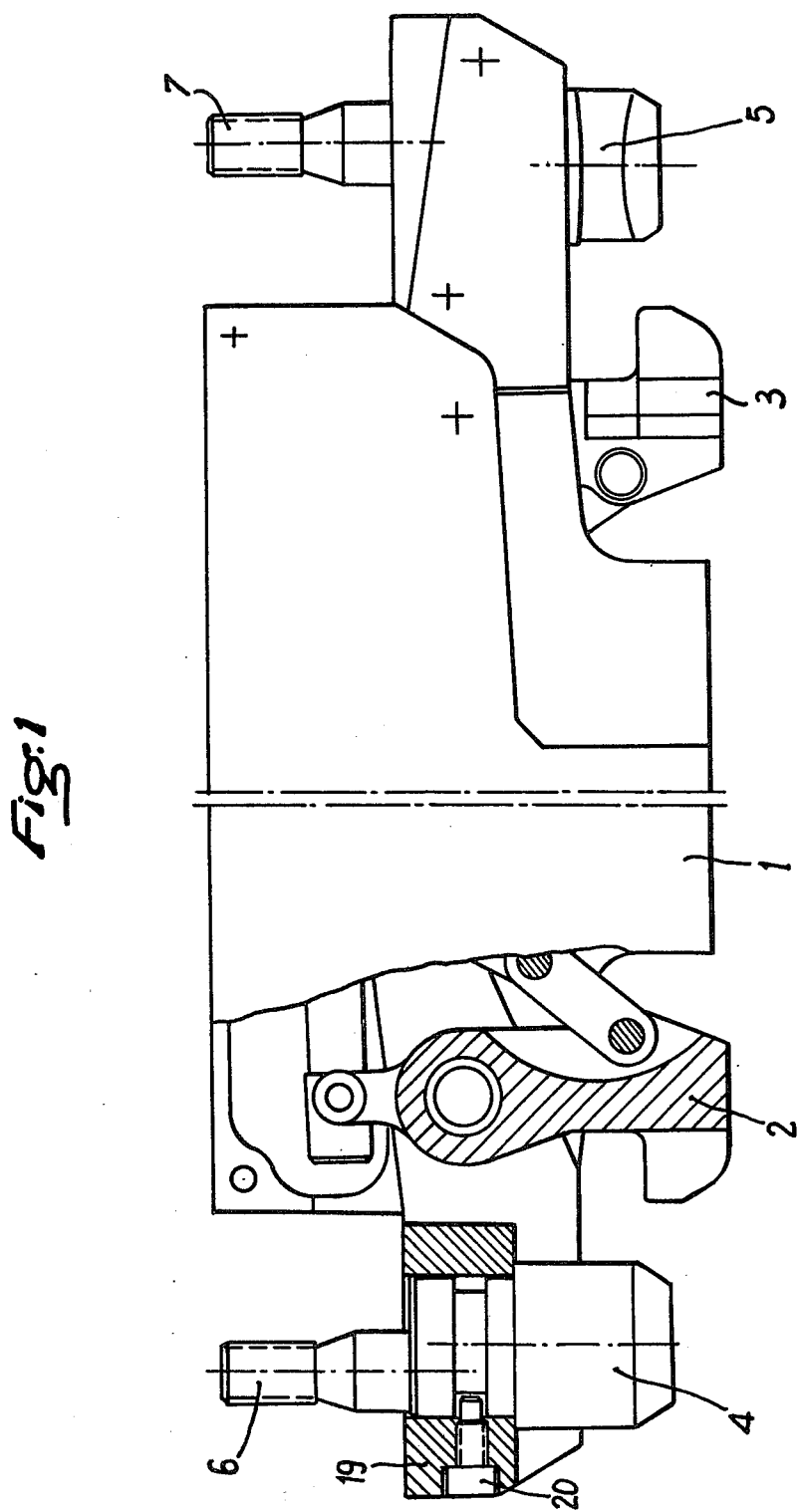
FIG. 1 is a side-elevational, part-sectional view, with a central portion broken away, of a release mechanism ejector normally designed for carrying loads equipped with so-called "saddle" members, and comprising detachable centering cylindrical members.

Referring first to FIG. 1, the reference numeral 1 designates the release mechanism which is no part of this invention, 2 and 3 designating twin hooks corresponding to the so-called "saddle" members already disclosed in U.S. Pat. Nos. 3,854,680 and 3,854,681 and referred to therein as "bridge pieces or members". The assembly illustrated further comprises detachable centering members 4, 5 of which the screw-threaded portions 6 and 7 are intended for fastening the carrier device to the aircraft; however, these fastening means may differ therefrom, as will be explained presently.

FIG. 2 illustrates a support or bracket adapted to be substituted for the centering members 4 and 5. This bracket 8 comprises a screw-threaded portion 6 corresponding to a similar portion 6 or 7 of the centering members 4 and 5 of FIG. 1. A single hook 9 corresponds to the ring 10 secured to the load. A spring 11 constantly urges the heel 12 of hook 9 for engagement with the twin hook 2 between the two noses constituting said twin hook. A notch 13 formed in bracket 8 is engageable by said ring 10 and permits the insertion of the nose portion 14 of the hook 9 into the eye of ring 10.

A pivot pin 15 is secured to a strap 16 in which the hook 9 can oscillate according to the position of the twin hook 2.

In FIG. 3 the bracket 8 is shown with its arm-forming lateral extensions 17, 18 carrying at their outer ends wedging screws 21 of known type.

In FIG. 2 the phantom lines illustrate one fraction of the main structure of the release mechanism 1 equipped with the device 8, the same Figure showing in section and thick lines at 19 the extension of this mechanism which receives said bracket 8 as a substitute for the centering member 4, said bracket 8 being secured by a screw 20 and also retained by the heel 12 of hook 9 engaging the twin hook 2.

The mode of operation of this mechanism which results from the fitting of bracket member 8 will be readily understood.

Urged by spring 11, the single hook 9 follows the twin hook 2 during its movements caused as usual during the load coupling or jettisoning operations. Thus, the hook 9 engages the ring 10, or escapes therefrom, without any particular complications.

The axes of the ring holes are coincident with those of the bores of extensions 19, whereby the distance between centers of hooks 9 corresponds to the distance between centers of rings 10, and these rings 10 engage the notches 13 with the clearance necessary and sufficient for wedging the load in the longitudinal direction.

Moreover, when the load is suspended by means of its rings 10, any lateral oscillation of the load is positively prevented by the jack-forming wedging screws 21.

Of course, the initial condition illustrated in FIG. 1 is restored when disassembling the bracket 8 and the single hook 9 associated therewith, and also when this bracket 8 is replaced by the initial centering members such as 4 and 5.

Figure 4:
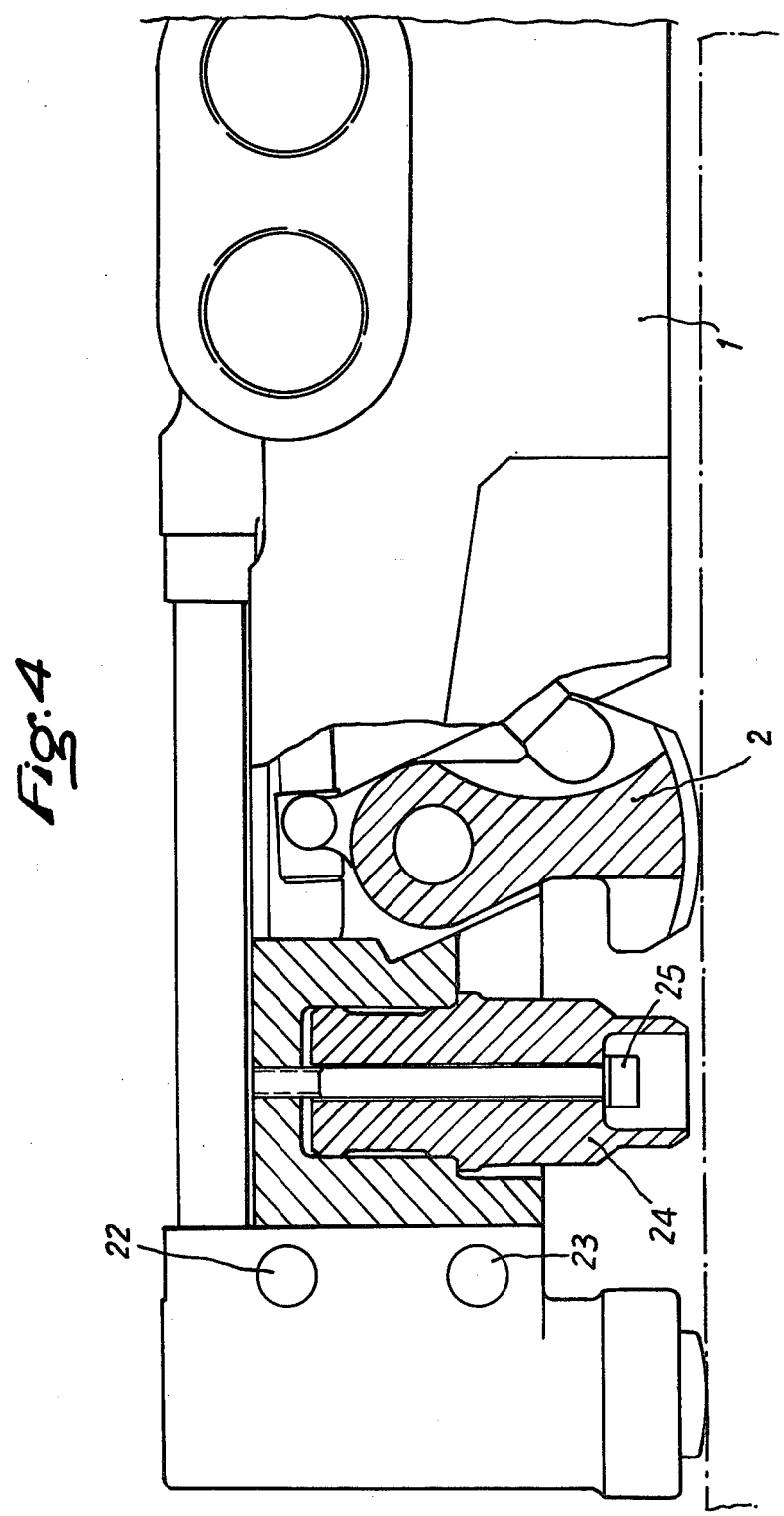
FIG. 4 illustrates in fragmentary side elevational view and parts broken away a modified ejector also comprising detachable cylindrical members intended for use with the so-called "saddle" members.

It will be seen that the carrier device is secured by means of screw-threaded portions 6 and 7 corresponding to certain operating conditions, but this fastening procedure requires the disassembling of the carrier device for exchanging the detachable members. In other circumstances, the carrier device is secured to the aircraft structure by means of transverse bolts 22 and 23 (FIG. 4). The detachable centering members 24 corresponding to members 4 and 5 of FIG. 1 are themselves secured to the carrier device by means of vertical screws 25.

In FIG. 5 there is shown at 28 a bracket corresponding to the bracket 8 of FIGS. 1 - 3, which is also interchangeable with the detachable member 24 and comprises, like said bracket 8, a single hook 9 with its heel 12, a notch 13 and a pivot pin 15 secured to a strap 16. Alternatively, a member 26 formed integrally with said hook 9 and engaged by a return piston 27 may be provided, this return piston being responsive to a compression spring 29 so as to keep the heel 12 in engagement with the twin hook 2. This spring 29 engages the bottom of piston 27 and reacts against a screw plug 30 fitted in the upper end of bracket 28.

FIG. 6 illustrates the lateral arms 17, 18 and the wedging screws 21 formed integrally with bracket 28 in this case. A pair of vertical screws 31, 32 are provided for securing the bracket 28 to the carrier device 1 by engaging the corresponding tapped holes formed in the lateral projections 33 and 34 of the ejector.

It is unnecessary to describe in detail the mode of operation of this modified structure, since this operation is the same as that of the preceding form of embodiment. Its principle advantage lies in the fact that the operator may change from one carrier version to another without disassembling the carrier device.

Of course, no preliminary disassembling operation is required for reaching the fastening screws 25 of the centering members, and also the fastening screws 31, 32 of brackets 28 disposed beneath the carrier device 1.

What we claim is:

1. An ejector, for suspending loads under aircraft, comprising a carrier device having at each load suspension point:
    i a first hook pivotally mounted in said carrier device and shaped to co-act with a saddle suspension member of the load,
    ii a fastening means disposed in the vicinity of said first hook,
    iii a detachable device removably mounted in said fastening means, said detachable device comprising
        a a housing for receiving an upper part of a load ring,
        b a second hook mounted on and pivotable about a horizontal pin and adapted in a closed position to lock said load ring in said housing, and
        c spring means urging said second hook against said first hook such that opening and closing movements of said first hook automatically cause opening and closing movements of the second hook.

2. An ejector, as claimed in claim 1, wherein said detachable device comprises means for laterally wedging the load.

3. An ejector, as claimed in claim 1, wherein said detachable device comprises a screw-threaded end for engagement with the aircraft.

4. An ejector, as claimed in claim 1, wherein said detachable device is secured therein by screws so as to be removable therefrom without dissembling of the carrier device.

* * * * *